United States Patent
Hasson et al.

(10) Patent No.: US 12,483,592 B2
(45) Date of Patent: Nov. 25, 2025

(54) METHOD AND APPARATUS FOR ENFORCING REALTIME ACCESS CONTROLS FOR ENDPOINTS

(71) Applicant: BeyondTrust Corporation, Johns Creek, GA (US)

(72) Inventors: Donald Warren Hasson, Madison, MS (US); David William Durham, Raymond, MS (US); Dustin L. Majure, Madison, MS (US)

(73) Assignee: BeyondTrust Corporation, Johns Creek, GA (US)

( * ) Notice: Subject to any disclaimer, the term of this patent is extended or adjusted under 35 U.S.C. 154(b) by 102 days.

(21) Appl. No.: 16/505,245

(22) Filed: Jul. 8, 2019

(65) Prior Publication Data

US 2020/0014726 A1    Jan. 9, 2020

Related U.S. Application Data

(63) Continuation of application No. 15/966,984, filed on Apr. 30, 2018, now Pat. No. 10,348,772, which is a continuation of application No. 15/133,598, filed on Apr. 20, 2016, now Pat. No. 9,961,112.

(60) Provisional application No. 62/150,006, filed on Apr. 20, 2015.

(51) Int. Cl.
    *H04L 9/40* (2022.01)

(52) U.S. Cl.
    CPC ........... *H04L 63/20* (2013.01); *H04L 63/102* (2013.01)

(58) Field of Classification Search
    CPC ....... H04L 63/20; H04L 63/08; H04L 63/102; H04L 63/10; H04L 63/164; H04L 41/0893
    USPC .......................................................... 726/1
    See application file for complete search history.

(56) References Cited

U.S. PATENT DOCUMENTS

| | | |
|---|---|---|
| 5,719,786 A | 2/1998 | Nelson |
| 6,123,737 A | 9/2000 | Sadowsky |
| 6,327,579 B1 | 12/2001 | Crawford |
| 6,336,135 B1 * | 1/2002 | Niblett ...................... H04L 9/40 709/215 |
| 6,353,446 B1 | 3/2002 | Vaughn et al. |
| 6,466,654 B1 | 10/2002 | Cooper et al. |
| 7,117,529 B1 | 10/2006 | Odonnell |
| 7,240,102 B1 | 7/2007 | Kouznetsov et al. |
| 7,346,922 B2 | 3/2008 | Miliefsky |
| 7,373,553 B2 | 5/2008 | Trip et al. |
| 7,376,538 B1 | 5/2008 | Eatough |

(Continued)

FOREIGN PATENT DOCUMENTS

WO    2005032892 A1    4/2005

OTHER PUBLICATIONS

NPL Search Results (Year: 2020).*

*Primary Examiner* — Syed A Zaidi
(74) *Attorney, Agent, or Firm* — Bradley Arant Boult Cummings LLP; Daniel E. Sineway, Esq.; Adam J. Thompson, Esq.

(57) ABSTRACT

The disclosed system includes privileged access management (PAM) appliance that facilitates establishing a session between an accessor device and an endpoint device. Generally, an access application can be pushed to the endpoint device. Once received, the endpoint device can automatically execute the access application. When executed, the access application can connect to the PAM appliance. The PAM appliance can establish the session between the accessor device and the endpoint device.

20 Claims, 13 Drawing Sheets

(56) References Cited

U.S. PATENT DOCUMENTS

| | | |
|---|---|---|
| 7,539,627 B2 | 5/2009 | Schmidt |
| 7,539,733 B2 | 5/2009 | Mohammed et al. |
| 7,565,700 B2 | 7/2009 | Bellwood et al. |
| 7,587,588 B2 | 9/2009 | Clemmons et al. |
| 7,680,944 B1 | 3/2010 | Taghizadeh |
| 7,908,401 B2 | 3/2011 | Chang |
| 7,941,848 B2 | 5/2011 | Yadav et al. |
| 7,958,247 B2 | 6/2011 | Abu-Samaha |
| 8,024,399 B2 | 9/2011 | Reisman |
| 8,112,513 B2 | 2/2012 | Margulis |
| 8,156,205 B1 | 4/2012 | Forsberg |
| 8,166,310 B2 | 4/2012 | Harrison et al. |
| 8,321,540 B2 | 11/2012 | Webb-Johnson |
| 8,335,831 B2 | 12/2012 | Fan |
| 8,434,129 B2 | 4/2013 | Kannappan |
| 8,527,774 B2 | 9/2013 | Fallows |
| 8,850,516 B1 | 9/2014 | Hrebicek |
| 8,880,616 B2 | 11/2014 | Schuelke |
| 8,924,459 B2 | 12/2014 | Gagne et al. |
| 8,966,075 B1 | 2/2015 | Chickering et al. |
| 9,055,055 B1 | 6/2015 | Strand |
| 9,178,773 B1 | 11/2015 | Tassone |
| 9,246,979 B2 | 1/2016 | Bomgaars |
| 9,305,182 B1 | 4/2016 | Berls |
| 9,473,540 B2 * | 10/2016 | Silver ................. H04M 15/63 |
| 9,712,514 B2 | 7/2017 | Brieman |
| 9,754,303 B1 | 9/2017 | Jagtap |
| 2001/0036176 A1 | 11/2001 | Girard |
| 2001/0051890 A1 | 12/2001 | Burgess |
| 2002/0062379 A1 * | 5/2002 | Widegren ............. H04L 65/608 |
| | | 709/227 |
| 2002/0075844 A1 | 6/2002 | Hagen |
| 2002/0091819 A1 | 7/2002 | Melchione |
| 2002/0120749 A1 | 8/2002 | Widegren et al. |
| 2002/0161895 A1 | 10/2002 | Appiah et al. |
| 2002/0169783 A1 | 11/2002 | Kreulen et al. |
| 2003/0004791 A1 | 1/2003 | Kojima |
| 2003/0008265 A1 | 1/2003 | Helmick et al. |
| 2003/0009754 A1 | 1/2003 | Rowley |
| 2003/0018704 A1 | 1/2003 | Polychronidis |
| 2003/0023476 A1 | 1/2003 | Gainey |
| 2003/0033308 A1 | 2/2003 | Patel |
| 2003/0065731 A1 | 4/2003 | Mohammad |
| 2003/0065738 A1 | 4/2003 | Yang |
| 2003/0084010 A1 | 5/2003 | Bigus |
| 2003/0093530 A1 | 5/2003 | Syed |
| 2003/0093692 A1 | 5/2003 | Porras |
| 2003/0120135 A1 | 6/2003 | Gopinathan et al. |
| 2003/0120557 A1 | 6/2003 | Evans |
| 2003/0131084 A1 | 7/2003 | Pizzorni |
| 2003/0149740 A1 | 8/2003 | Wookey |
| 2003/0225905 A1 | 12/2003 | Scifres et al. |
| 2003/0233432 A1 | 12/2003 | Davis et al. |
| 2004/0001514 A1 | 1/2004 | Wookey et al. |
| 2004/0003073 A1 | 1/2004 | Krzyzanowski et al. |
| 2004/0153712 A1 | 8/2004 | Owhadi et al. |
| 2004/0173059 A1 | 9/2004 | Klein |
| 2004/0249975 A1 | 12/2004 | Tuck et al. |
| 2005/0038827 A1 | 2/2005 | Hooks |
| 2005/0050319 A1 | 3/2005 | Suraski |
| 2005/0080897 A1 | 4/2005 | Braun et al. |
| 2005/0132030 A1 | 6/2005 | Hopen |
| 2005/0177869 A1 | 8/2005 | Savage |
| 2005/0190769 A1 | 9/2005 | Smith |
| 2005/0234824 A1 | 10/2005 | Gill |
| 2005/0289226 A1 | 12/2005 | Mohammed et al. |
| 2006/0010485 A1 | 1/2006 | Gorman |
| 2006/0017551 A1 | 1/2006 | Neher |
| 2006/0031537 A1 | 2/2006 | Boutboul |
| 2006/0047927 A1 | 3/2006 | Xing et al. |
| 2006/0053447 A1 | 3/2006 | Krzyzanowski et al. |
| 2006/0064582 A1 | 3/2006 | Teal |
| 2006/0072721 A1 | 4/2006 | Wisniewski |
| 2006/0104306 A1 * | 5/2006 | Adamczyk ........... H04L 69/327 |
| | | 370/352 |
| 2006/0159243 A1 | 7/2006 | Mangione et al. |
| 2006/0248522 A1 | 11/2006 | Lakshminarayanan |
| 2006/0271968 A1 | 11/2006 | Zellner |
| 2006/0277287 A1 | 12/2006 | Mccall et al. |
| 2007/0021138 A1 | 1/2007 | Allen et al. |
| 2007/0033265 A1 | 2/2007 | Anderson et al. |
| 2007/0044034 A1 | 2/2007 | Nieves |
| 2007/0047459 A1 | 3/2007 | Kadaba |
| 2007/0054686 A1 | 3/2007 | Allen |
| 2007/0067098 A1 | 3/2007 | Zelentsov |
| 2007/0130457 A1 | 6/2007 | Kamat et al. |
| 2007/0143824 A1 | 6/2007 | Shahbazi |
| 2007/0176787 A1 | 8/2007 | Iten et al. |
| 2007/0180501 A1 | 8/2007 | Yadav et al. |
| 2007/0218875 A1 | 9/2007 | Calhoun et al. |
| 2007/0239884 A1 | 10/2007 | Karmakar |
| 2007/0253418 A1 | 11/2007 | Shiri et al. |
| 2007/0255604 A1 | 11/2007 | Seelig |
| 2007/0260673 A1 | 11/2007 | Shenfiled |
| 2007/0268837 A1 | 11/2007 | Melton |
| 2007/0294368 A1 * | 12/2007 | Bomgaars ............... H04L 63/20 |
| | | 709/217 |
| 2007/0299953 A1 | 12/2007 | Walker |
| 2007/0300291 A1 | 12/2007 | Bomgaars |
| 2008/0010480 A1 * | 1/2008 | Hurley ................... H04L 67/26 |
| | | 714/1 |
| 2008/0034060 A1 | 2/2008 | Fisher |
| 2008/0040441 A1 | 2/2008 | Maes |
| 2008/0065236 A1 | 3/2008 | Bristol |
| 2008/0091454 A1 | 4/2008 | Fisher |
| 2008/0172574 A1 | 7/2008 | Fisher |
| 2008/0184241 A1 | 7/2008 | Headrick et al. |
| 2008/0244705 A1 * | 10/2008 | Cromer .................. H04L 67/34 |
| | | 709/228 |
| 2009/0007217 A1 | 1/2009 | Birger |
| 2009/0019367 A1 | 1/2009 | Cavagnari |
| 2009/0052675 A1 | 2/2009 | Levow et al. |
| 2009/0077184 A1 | 3/2009 | Brewer et al. |
| 2009/0164554 A1 | 6/2009 | Wei |
| 2009/0187651 A1 | 7/2009 | Schuckenbrock et al. |
| 2009/0199276 A1 | 8/2009 | Schneider |
| 2009/0201303 A1 | 8/2009 | Westerhoff |
| 2009/0248794 A1 | 10/2009 | Helms |
| 2009/0271472 A1 | 10/2009 | Scheifler |
| 2009/0299793 A1 * | 12/2009 | Guzel ..................... G06Q 20/40 |
| | | 705/7.27 |
| 2010/0071043 A1 | 3/2010 | Babula et al. |
| 2010/0094847 A1 * | 4/2010 | Malan .................... H04L 69/18 |
| | | 707/705 |
| 2010/0138270 A1 | 6/2010 | Werth |
| 2010/0154009 A1 | 6/2010 | Del Sordo |
| 2010/0169497 A1 | 7/2010 | Klimentiev |
| 2010/0192020 A1 | 7/2010 | Van Riel |
| 2010/0192146 A1 | 7/2010 | Stay |
| 2010/0257596 A1 | 10/2010 | Ngo et al. |
| 2010/0281519 A1 * | 11/2010 | Das ....................... H04L 63/166 |
| | | 726/3 |
| 2011/0099604 A1 | 4/2011 | Zhou |
| 2011/0107406 A1 | 5/2011 | Frost et al. |
| 2011/0154231 A1 | 6/2011 | Cherdon |
| 2011/0191799 A1 | 8/2011 | Raza |
| 2011/0273294 A1 | 11/2011 | Harwell |
| 2011/0276683 A1 | 11/2011 | Goldschlag |
| 2011/0277027 A1 | 11/2011 | Hayton |
| 2011/0302629 A1 | 12/2011 | Whitson et al. |
| 2012/0005746 A1 * | 1/2012 | Wei ................... H04W 12/0806 |
| | | 726/15 |
| 2012/0117212 A1 | 5/2012 | Fries |
| 2012/0147894 A1 | 6/2012 | Mulligan |
| 2012/0265976 A1 * | 10/2012 | Spiers .................. G06F 9/45533 |
| | | 713/2 |
| 2012/0311564 A1 | 12/2012 | Khalid |
| 2012/0331524 A1 | 12/2012 | Mower et al. |
| 2013/0081112 A1 | 3/2013 | Kelly |
| 2013/0114610 A1 | 5/2013 | Polcyn |
| 2014/0013409 A1 | 1/2014 | Halageri |
| 2014/0172783 A1 | 6/2014 | Suzuki |
| 2014/0173594 A1 | 6/2014 | Ng et al. |

(56) References Cited

U.S. PATENT DOCUMENTS

| | | |
|---|---|---|
| 2014/0188676 A1 | 7/2014 | Marmolejo-Meillon |
| 2014/0337834 A1 | 11/2014 | Adogla |
| 2015/0020164 A1 | 1/2015 | Tankov |
| 2015/0067171 A1 | 3/2015 | Yum |
| 2015/0089620 A1 | 3/2015 | Manza |
| 2015/0200821 A1 | 7/2015 | Sade |
| 2015/0227926 A1 | 8/2015 | Grigg |
| 2015/0264035 A1 | 9/2015 | Waterhouse |
| 2015/0304292 A1 | 10/2015 | Dulkin |
| 2015/0350019 A1 | 12/2015 | Terayama |
| 2015/0381593 A1 | 12/2015 | Low |
| 2016/0234198 A1 | 8/2016 | Brieman |
| 2016/0286003 A1 | 9/2016 | Pessis |
| 2016/0299790 A1 | 10/2016 | Wagner |
| 2016/0301675 A1 | 10/2016 | Wiles |
| 2016/0308876 A1 | 10/2016 | Smith, III |
| 2016/0308906 A1 | 10/2016 | Hasson |
| 2017/0300687 A1 | 10/2017 | Cherukuri |
| 2018/0248916 A1 | 8/2018 | Hasson |

* cited by examiner

| Bomgar - Approval Request | X |

You must first request approval to access this Jump Client. Please confirm the details below and describe the reason for the access request.

701 — Jump Policy: My Jump Policy

705 — Jump Policy Description: This is my description of the jump policy and all the data that it may contain.

711 — Approvers: John Smith, Jim Jones, Mary Johnson

713 — Reason for Request:

715 — Requested Access Time: 03/18/2014 02:00PM    2 Hours

[Request] [Cancel]

FIG. 7B

METHOD AND APPARATUS FOR ENFORCING REALTIME ACCESS CONTROLS FOR ENDPOINTS

CROSS REFERENCE TO RELATED APPLICATIONS

This application is a continuation of U.S. application Ser. No. 15/966,984, filed Apr. 30, 2018, and entitled "METHOD AND APPARATUS FOR ENFORCING REALTIME ACCESS CONTROLS FOR ENDPOINTS." which is a continuation of U.S. Pat. No. 9,961,112, filed Apr. 20, 2016, and entitled "METHOD AND APPARATUS FOR ENFORCING REAL TIME ACCESS CONTROLS FOR ENDPOINTS," which claims priority from U.S. Provisional Patent App. No. 62/150,006, filed Apr. 20, 2015, and entitled "METHOD AND APPARATUS FOR ENFORCING REALTIME ACCESS CONTROLS FOR ENDPOINTS," the entireties of which are incorporated herein by reference.

BACKGROUND OF THE INVENTION

Information systems are some of the most important assets of an organization. Information systems that store privileged or sensitive information need to be secured with utmost vigilance and care, as exploiting these systems by unauthorized users or entities may result in financial and business loses.

Various compliance organizations, rules, regulations, and standards are created to aid organizations and those who audit them create and enforce policies that minimize risk of unauthorized access of important information systems and the data stored on those systems. As part of these policies organizations utilize various techniques to control, monitor and report on access to important information system assets.

Traditional solutions include segmenting networks such that only entities with access to those networks can access information system assets deployed in that network. This solution results in overly broad access when entities require access only to a particular asset vs. all assets in a network. Other solutions involve setting up login or access credentials with various access rights for each system and sharing those credentials with only the entities that require access to those systems. Setting up access credentials per asset and attempting to disseminate that information only to select entities is expensive to coordinate, maintain, and provide accurate audit trail.

Some organizations use a combination of these techniques increasing the cost to organization with marginal improvement in granular access control and audit reporting.

Based on the foregoing, there is a clear need for approaches that provide and enforce real time access controls to sensitive assets that provides granular access control, is easy to setup, administer, maintain, use, and audit.

BRIEF DESCRIPTION OF THE DRAWINGS

FIGS. 7A-7C are diagrams of example user interfaces used in the processes of FIGS. 1-6, according to various embodiments;

DESCRIPTION OF THE PREFERRED EMBODIMENT

An apparatus, method, and software for providing and enforcing realtime access controls to endpoints is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

When embodiments are described with respect to a wired network, it is contemplated that these embodiments have applicability to other networks including wireless systems. Similarly when embodiments are described with respect to computing devices they have applicability to physical, virtual, mobile, handheld, headless, and graphical devices and systems.

Figure 1A:
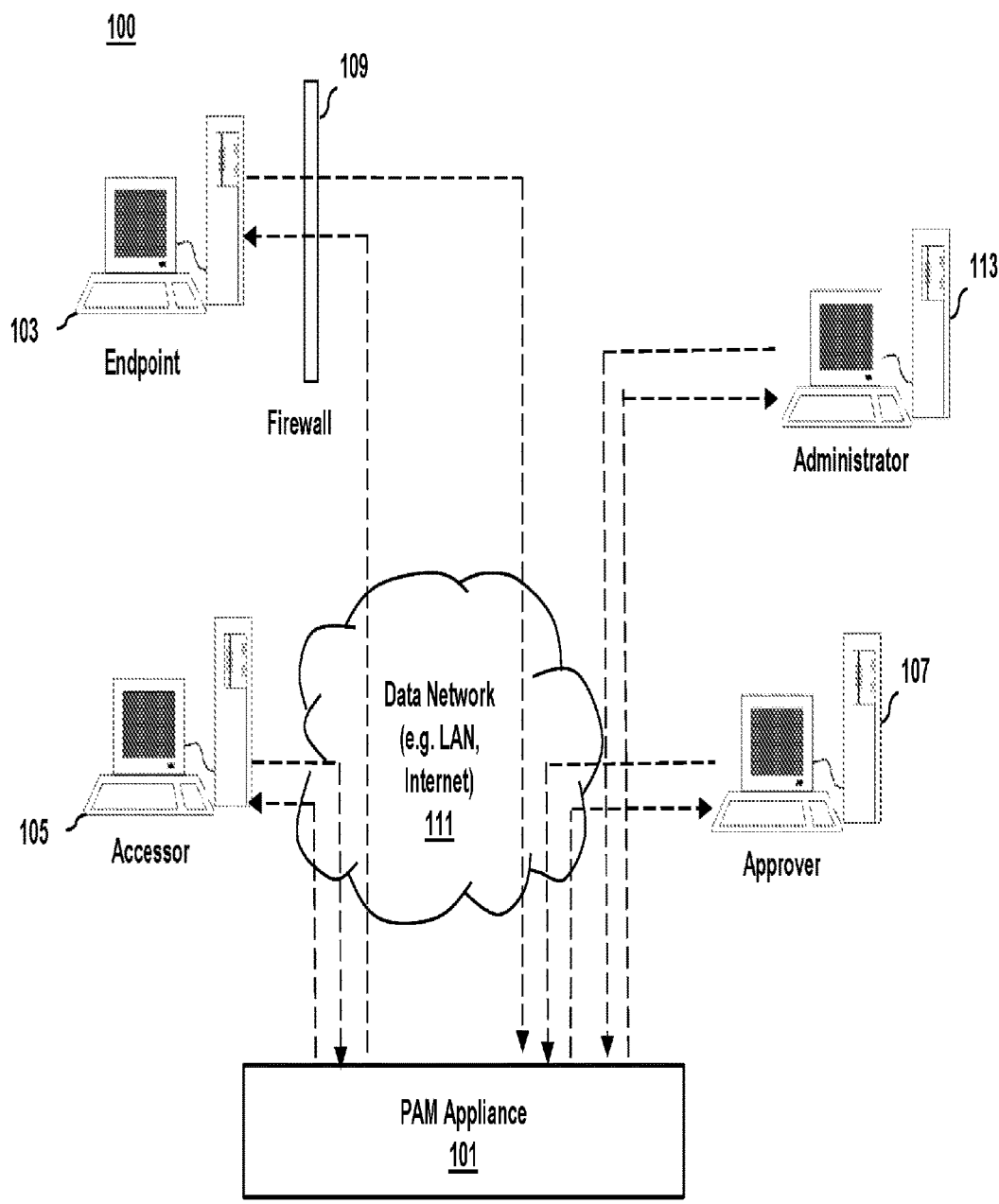
FIGS. 1A and 1B are, respectively, diagrams of a system and associated process for providing and enforcing real time access controls, according to certain embodiments.
Figure 1B:
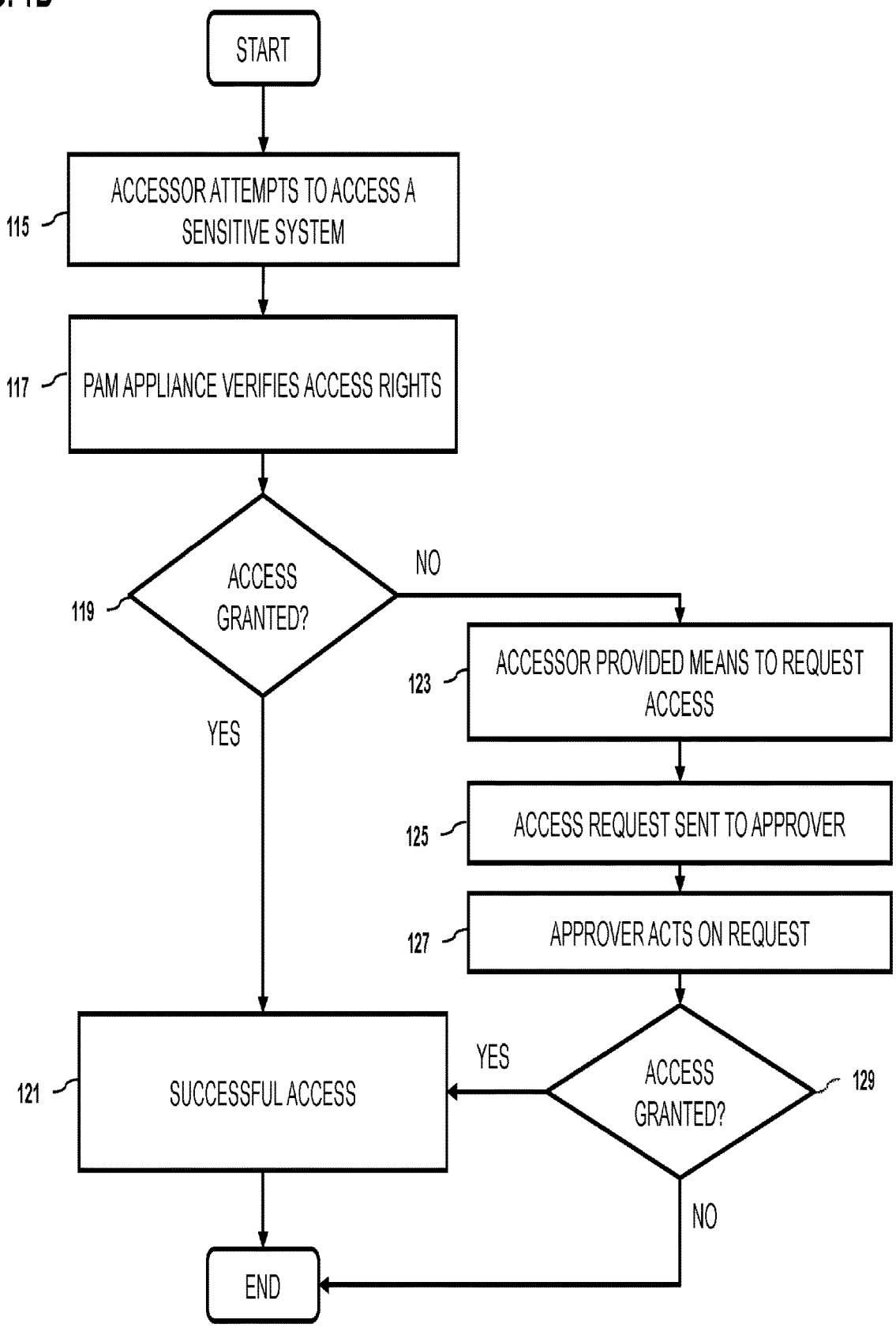

FIGS. 1A and 1B are diagrams, respectively, of a system and associated process for providing and enforcing real time access control to endpoints by accessors, administrators, and approvers, according to certain embodiments. For purposes of illustration, a communication system 100 (FIG. 1A) is described with respect to providing and enforcing real time access control to a customer network, as facilitated by a privileged access management appliance (PAM appliance) 101, between an endpoint system 103, accessor system 105, approver system 107, and administrator system 113, thereby enabling, for example, real time access control to resources (including software or applications available, as well as storage/database and hardware capabilities) of the endpoint system 103. The appliance 101 is further connected to the other systems through the data network 111. In certain embodiments, the systems may include the users of each system, such as the user of the endpoint system 103, user accessor of the accessor system 105, user approver of the approver system 107, administrative user of the administrator system 113, and agent user of the protocol agent described under FIG. 3. According to one embodiment, the appliance 101 can be implemented as a standalone hardware device; alternatively, the appliance 101 can be virtualized—i.e., virtual appliance. The appliance 101 may commonly be referred to as the PAM appliance, network appliance, or just appliance.

In this example, the approver system 107 provides, in certain embodiments, a real time access control for endpoint systems 103 over a data network 111 using the PAM appliance 101. By way of example, the data network 111 can be an internetwork, such as the global Internet, or a private network. The traffic during a session between the endpoint system 103 and any accessor system 105 is handled and managed at the PAM appliance 101. In an exemplary embodiment, the PAM appliance 101 is managed by an administrator system 113, who can access the PAM appliance 101 using a graphical user interface (GUI), such as a web interface. In some embodiments, the web interface may be replaced with a client application with the same capabilities. Such an application may be automatically installed or removed from the administrator system 113 and approver system 107 to provide real time access control to the resources of one of a plurality of endpoint systems 103.

The PAM appliance 101 also enables the administrator 113 to change settings (configuration parameters) on the appliance 101 itself, in addition to the software it contains. The appliance 101 also provides management functions including the management of accessor access rights via the web interface. After physical installation of the PAM appliance 101, the administrator 113 may log on to the appliance via the web interface by using the appliance's public Uniform Resource Locator (URL) address.

As shown, the PAM appliance 101 provides, in certain embodiments, an access management and control mechanism that is secure, easy to use, provides granular access controls, and implemented in a turn-key fashion. For the purposes of illustration, the appliance can be deployed by an organization and accessed by entities that are either internal or external to that organization. In certain embodiments, the PAM appliance can be implemented to accommodate access and approval from mobile systems and means to contact those mobile systems even when disconnected from PAM appliance.

In the scenario of FIG. 1A, the deployed appliance 101 can serve as a remote access, access control, access management, audit, and reporting system for the organization. In one embodiment, the appliance is implemented according to an onsite deployment model. A hosted Software-as-a-Service (Saas) model can also be an offering of this approach. In addition, the appliance can be further defined as a physical or virtual computing system. This can include but not limited to a server rack-mountable server, non-rack-mountable server, desktop computer, laptop computer, and virtual machines.

Additionally, the PAM appliance 101 has the capability of allowing on-demand product use from anywhere in the world. For example, as long as the network appliance is deployed accessible via a public IP address, an accessor 105, approver 107, or administrator 113 can log in his/her account via a web interface hosted on the network appliance 101 or use a mobile application to connect to and gain access to the appliance or the endpoint as long as the effective policies grant them such access.

In one embodiment, endpoints 103 can also be accessed and controlled by an accessor 105 via agents that handle protocol conversions and bridge disparate networks, e.g., by acting as proxies or push agents. In another embodiment, the accessors 105 may gain access to the PAM appliance via the use of access consoles, and endpoints 103 may be accessed via use of endpoint clients.

An Access console (i.e., local client, accessor application/client, or web client) can be downloaded from a web interface for remote access to endpoints 103, request access when needed, monitor ongoing sessions, and verify granted access. Also, an endpoint console (i.e., remote client, endpoint application/client, or web client) can be downloaded from administrative interface hosted on the PAM appliance 101—this endpoint client further can be distributed to endpoints to enable them for secure remote access and policy enforcement. In another embodiment these clients can be downloaded from a third party hosted or Organization's self-hosted download location or mobile application stores.

The appliance 101, in various embodiments, executes software applications that can receive, handle, manage, and dispatch system or data messages to and from the Access Consoles and Endpoint Clients via a secure connection (e.g., 256-bit Advance Encryption Standard (AES) Transport Layer Security (TLS)).

As seen in FIG. 1A, an Accessor 105 can access an endpoint 103 via PAM appliance 101. The accessor system 105 is a device attempting to access endpoint system (or device) 103 or resources of the endpoint system 103 through the network. Additionally, an administrator can set and assign permissions, policies, and access rights. An approver 107 can grant real time or scheduled access to endpoints to specific accessors either by accessing a web based management interface hosted on the appliance, or via an Access console that is connected to the appliance. In some embodiments, the web based management interface may also be interacted with via email/SMS. The traffic between all systems is handled and managed at the appliance. To facilitate broadest reach and to easily work through firewalls 109 and proxy servers, the system is designed such that all connections from the clients are initiated outbound towards the appliance.

According to one embodiment, the operation of the PAM appliance 101 is depicted in FIG. 1B. In step 115, the process detects an attempt to establish (or that a session has been established and is on-going), by an accessor system (or device) 105, an accessing of resources at an endpoint system 103 via the PAM appliance 101. The endpoint system (or device) 103 may, in some embodiments, be one of many within a network. Based on access policies assigned to each endpoint system 103, the PAM appliance 101 establishes a session between the endpoint system 103 and the accessor system 105. Under such a scenario, the PAM appliance 101 acts between the endpoint system 103 and the accessor system 105 thus granting access to the endpoint system 103 once accessibility by the accessor system 105 is verified by the PAM appliance 101 as described in step 117. In step 119, a determination of whether access is granted is made, if access was granted, the access is successful, per step 121, however if access was not granted, the accessor system 105 requests access from the PAM appliance 101 which is then acted upon in real time by an approver at the approver system 107 which can deny or grant access based on known information about the accessor at the accessor system 105. Steps 123-129, describe certain embodiments where the PAM appliance 101 provides a mean to make a request for access to the accessor system 105, per step 123. Then in step 125, a request for access is sent by the PAM appliance to an approver system 107 which may be used by an administrator to real time grant or deny access by the accessor system 105. In step 127 the administrator that approves of the access (or approver) then acts on the request and provides the PAM appliance with their decision of whether access is granted or denied, per step 129.

Figure 2:
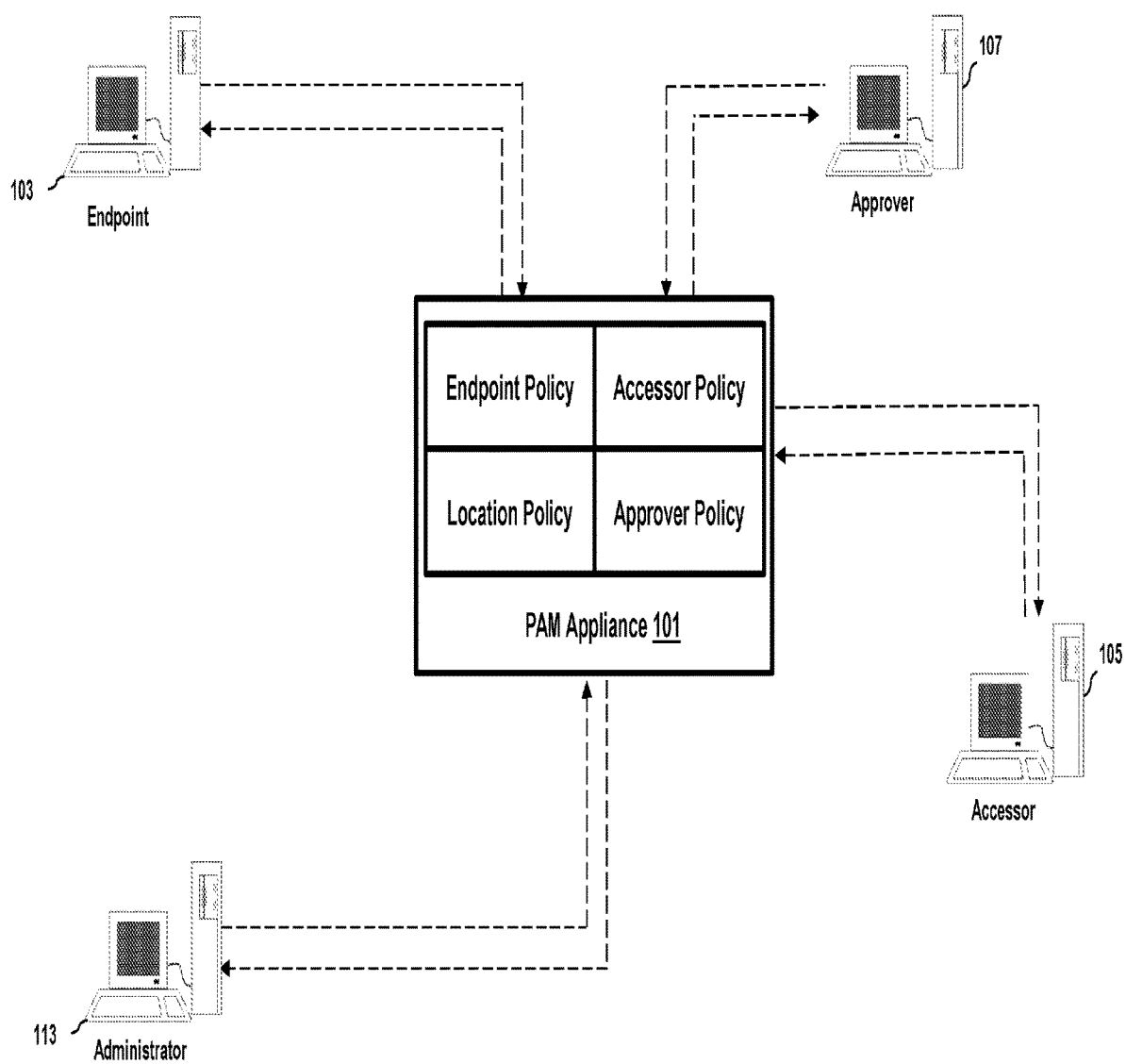
FIG. 2, diagram of policy enforcement by the access control system, according to certain embodiments.

FIG. 2 is a diagram of a system for providing realtime access control for remote access, according to certain embodiments. A PAM appliance 101 consists of a web server, applications, databases, downloadable installers, tools for appliance management, communication mechanisms, means for storing recordings, recording viewers, and self-checking mechanisms. Web applications are used by Administrators 113 in setting up access policies, assigning those policies to endpoints, accessors, and approvers. Policies can be setup to grant always access, time-based access, always request for access, one-time or multi-instance access and any combination thereof. Policies can also be setup to override certain access rights based on location of either the endpoint or the accessor. Additional policies can be configured and assigned to Approvers 107 such that they can approve only for certain times, endpoints 103, or duration. Databases are used for storing and retrieving policy information, event information, log data, and audit trail.

By way of example, two approaches are described. One approach provides "always access" to an endpoint 103 by an accessor with just a notification to an approver. In this scenario, an accessor using an Access console, selects the endpoint from a list of endpoints that he or she has access to and requests access. Since the accessor and the selected endpoint has an "always access" resultant policy, the PAM appliance 101 will establish a session between the endpoint and the accessor. Once the session is established the accessor's access to the endpoint could potentially be governed by an in-session policy that either grants or denies access to various tools, commands, credentials, or resources. On successful or unsuccessful session establishment a notification is sent to the approver or an administrator selected system indicating that the accessor is now accessing an endpoint. The notification can be an email, a system log message, syslog event, an SMS, a mobile push notification, a mobile app notification, or a message in an Access Console that the approver is using.

In another approach, an "always request" policy is assigned to an endpoint. In this scenario, when an accessor attempts to access the endpoint 103, an approval request is sent to the approver. The request can be sent to the approver such that he or she can act upon it even if they were not actively connected to the PAM appliance 101. These mechanisms include but not limited to email, SMS, and mobile push notifications. Upon receiving the request the approver 107 can either grant or deny access, grant access for a certain duration or time, comment on the request, apply a more restrictive policy to be effective on the session or request to be added to the session when the accessor successfully initiates a session with the endpoint.

Accessors 105, Administrators 113, Endpoints 103, and Approvers 107 can either be internal or external to the organization that owns PAM appliance 101. Access control restrictions can be enforced in any combination of available permissions, settings, and assignments. As an embodiment an approver can approve an access request only from a particular accessor for a particular endpoint for a certain duration and only on a certain day and only approving the request from a desktop computer on the internal LAN of the organization. As another embodiment an accessor can access an endpoint without needing an approval but can only access at a certain time of day for certain duration and can access only one certain application on the endpoint while not on the internal network but can access any application while on the internal network of the organization.

Notifications and Approval requests carry sufficient information for the approver to understand the request and take appropriate action. Means are provided for the administrator 113 to configure and customize information included in these requests based on their organization policies.

As an embodiment at the end of an access session approver receives another notification with details of access session including video recording of the session, comments left by the accessor 105, and audit details. As another embodiment this information is sent automatically to an external log aggregation, analysis and auditing application.

Figure 3:
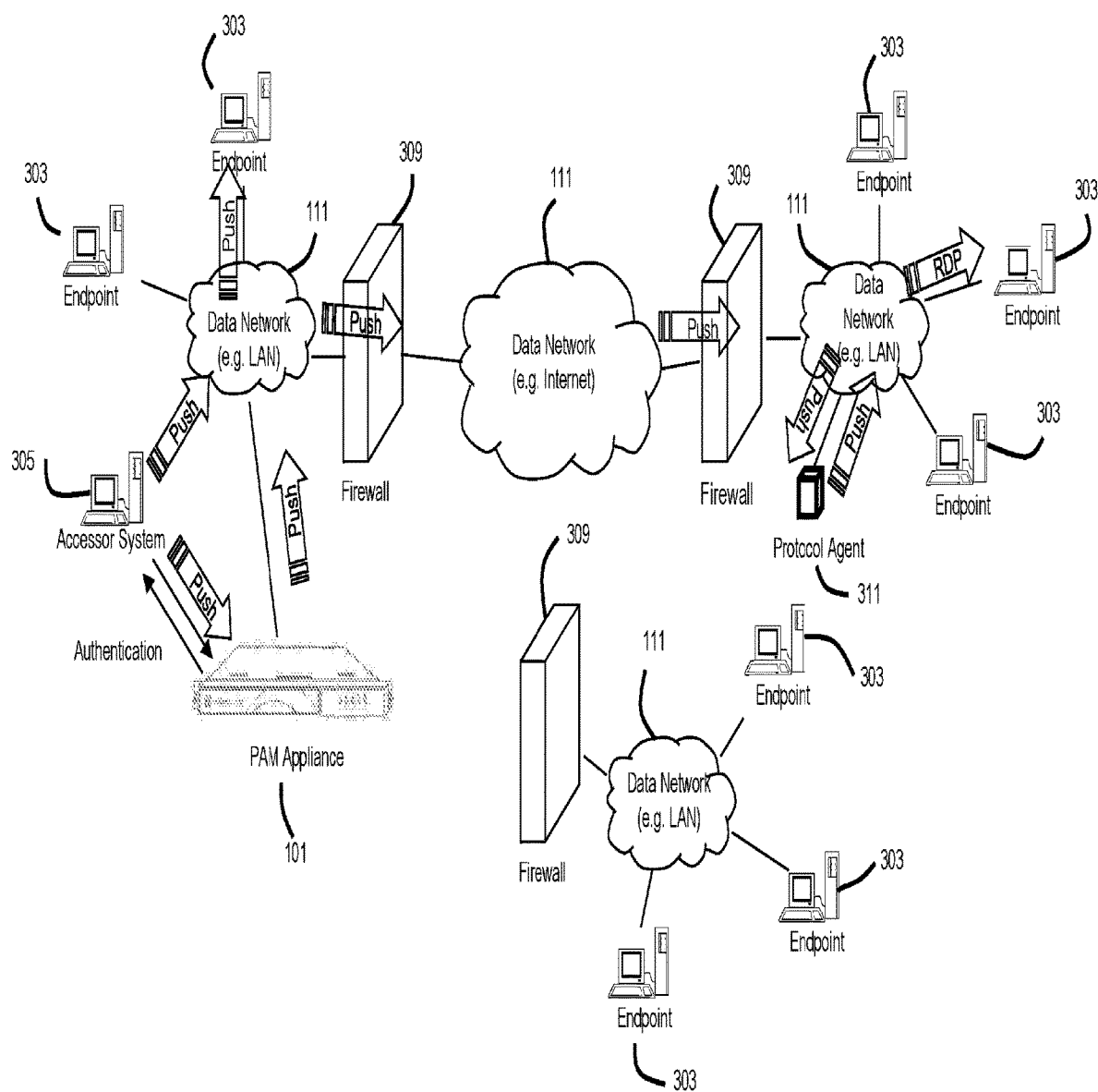
FIG. 3 is a diagram of a system capable of providing client less access within local area network (LAN) as well as remote networks, according to one embodiment.

FIG. 3 is a diagram illustrating clientless access to endpoints 303 while maintaining robust access controls. In addition to policy setting, enforcement, and approval process, this diagram illustrates a system and associated processes for providing access to endpoints 303 via a PAM appliance 101 as an agent or a proxy, according to certain embodiments. In this embodiment endpoint 303 access application is pushed to an endpoint, executed, and connected back to the accessor via PAM appliance 101. Push action can be achieved either directly from PAM appliance 101 or via the means of a Protocol Agent 311. In one embodiment Protocol Agent 311 pushes and automatically executes an endpoint client on an endpoint on behalf of the appliance. In another embodiment Protocol Agent 311 converts the access protocol used by the appliance to a protocol that is used by the endpoint for providing access. In one embodiment Protocol Agent 311 connects to the end point using RDP and connects to the PAM appliance 101 using a proprietary protocol. In this embodiment RDP access is restricted to the endpoints from the public internet but since Protocol Agent 311 can connect outbound to the appliance and can connect using RDP inbound to the endpoint on local LAN, Protocol Agent 311 has effectively and securely bridged access between disparate networks and protocols. In other embodiments protocols like VNC, SSH, and vPro are bridged.

A plurality of Accessors 305 can access the system at any given time. Similarly a plurality of approvers can be available at any given time. While Accessors 305 are in access sessions with endpoints they can invite other accessors into their session to provide guidance or help. These invites can be sent to either accessors already connected to the system or to those that simply setup a means for notification such as SMS or email. Upon receiving an email invite an accessor can join the same session as the invitee accessor by clicking on a URL, using a code, or launching a pre-existing access console and selecting an invitation. Plurality of accessors can share their screens, collaborate via chat, or transfer files among them based on policy settings.

FIG. 3 is an illustration of a system capable of providing Push technology within a local area network (LAN) as well as within a remote network, according to an exemplary embodiment. Without the need for pre-installed clients on an end-point system, the Push and Start System can be used by an accessor to transfer an application to an endpoint and execute the application to establish an access session connection back to the accessor provided sufficient access rights and approvals have been granted. The Push functionality provides reach to systems which are visible from within the network that the accessor's computer is connected to via a Local Push method and reach to systems within remote networks through a Push via a Push Agent mechanism.

In one embodiment, the actual Push of software to the remote computer and its execution can be accomplished via SMB (System Management Bus), Windows RPC (Remote Procedure Calls)/IPC (Inter Process Communication), Unix/Posix RPC, FTP (File Transfer Protocol), SSH (Secure Shell), HTTP (Hypertext Transfer Protocol) or other means.

The system, according to various embodiments, utilizes the following components (not shown): (1) an access console application; (2) a Push Server—which is what handles the operations in within the appliance; (3) an optional Push Agent; and (4) an endpoint application. It is contemplated that the Push Agent (e.g., Push Agent) can be an application that is installed on a system or alternatively can be a stand alone piece of hardware. The Push Server can be an application installed on an appliance 101 or a system (e.g., endpoint system 303, accessor system 305, or protocol agent 311 of the data network 111) or alternatively can also be a stand alone piece of hardware. The Push Server can also be a piece of software integrated into the client application (e.g., executing on the endpoint system 303) where it serves its purpose within the application in the background.

Furthermore, this Push Agent can be used as an agent for other purposes, such as a connection agent to another server (not shown) in its network (e.g., the network 111) or a second network (e.g., networks 111); that is, providing a connection to and forwarding of operations via a Push Agent, from the first network to a device of a second network (e.g., devices 303-309 of the various networks 101) via, for instance, a third network.

In this example, an endpoint application resident within a remote access and control appliance 101 or a Push server (not shown) can be accessed by a endpoint system 303 which is running a client application. The endpoint client application can be transferred to a remote system in this network (Local Push) (e.g., other endpoint systems 303 of the various networks) by utilizing a 'Push Agent' system or protocol agent 311. Furthermore, this Protocol Agent 311 can be used as an agent for other purposes, such as a connection agent to another server (not shown) in the second network; that is, providing a connection to and forwarding of operations via a Protocol Agent 311, from a first network to a device of a second network.

After the endpoint system 303 is connected to the remote Protocol Agent 311 (which resides within an appliance 101 or a computer) via the Push Server, the endpoint system 303 prompts the remote Protocol Agent 311 to transfer an application to a remote computer (e.g., endpoint systems 303), which resides outside of the network. In an exemplary embodiment, a Web browser based remote control is available and can perform a push instruction from a remote site to a targeted Protocol Agent 311. Upon receiving a request, the remote Protocol Agent 311 transfers the application to a client remote system. In this manner, integrated remote access and control tools enable both efficient remote problem resolution and critical visibility limitation when deploying application to a targeted client remote system. This also enables a service representative to efficiently implement application tools and maintain security throughout the enterprise right from the representative's desk.

In an exemplary embodiment, the appliance 101 uses certificate-based authentication to establish a persistent connection to the Protocol Agent 311. When requesting a remote access session on an endpoint system 303 via the Push functionality, the appliance 101 ensures that the endpoint system 303 has the right to push the client application to a targeted endpoint system (e.g., remote endpoint system 303). The client application then can be transferred from the Protocol Agent 311 to the remote client system. The accessor system 305 can then establish a session connection to the endpoint's system. In some cases, the session connection traverses one or more firewalls 309 as previously described.

In other embodiments, the appliance 101 uses the Protocol Agent 311 to further push an access application to an accessor system 305, for providing the accessor system 305 with access to the endpoint systems 303 through various sessions created on the appliance 101. Where the access application is pushed to the access system 305 only after the right to access has been granted or established. Where the access application may also be pushed to other access systems 305 one their access rights have been verified.

Figure 4:
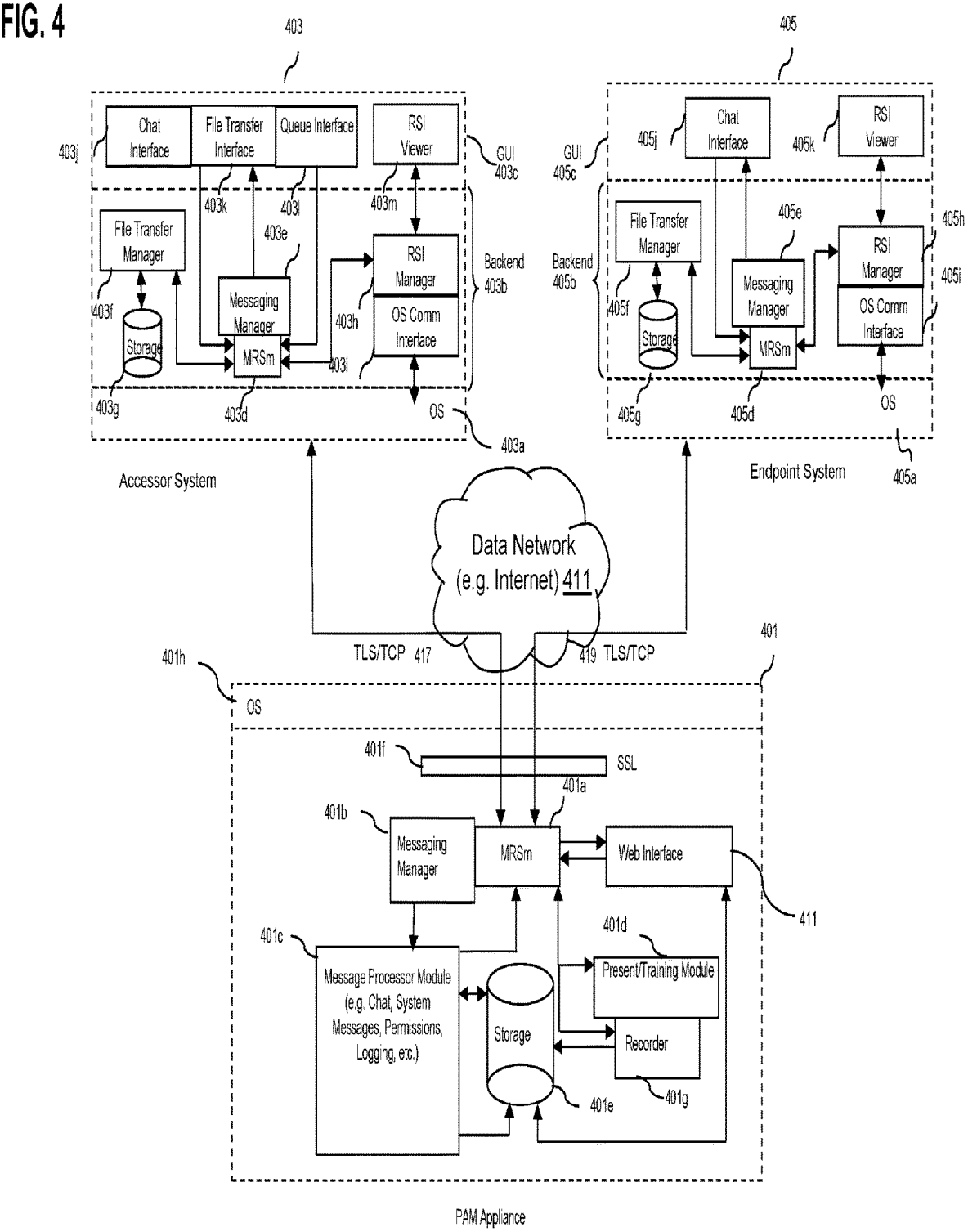
FIG. 4 is a diagram of the software architecture of the communication system of FIG. 1A, according to one embodiment.

FIG. 4 is a diagram of the software architecture of the communication system of FIG. 1, according to an exemplary embodiment. The product data transfer architecture, in one embodiment, is formed based on a message handling and routing system—denoted as a Message Router System (MRS) which includes a collection of MRS modules (i.e., MRSm 401a). The MRSm's 401a, 403d, and 405d provide a message routing system that enables the routing of data within envelopes among the appliance 401, accessor system 403 and endpoint system 405 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 401a, a toRouterAddress field specifying addressing information of the destination routing module.

In addition, the MRS 401a can communicate with other modules in a manner similar to that described above. By way of example, the MRSm 401a can communicate with the web interface 411, a message manager 401b, a message processor module 401c (includes chat, permission, logging, etc), a present/training 401d, a secure layer module 401f (e.g., SSL wrapper module), and a recorder module 401g. The web interface 411 can communicate with other application modules via the MRS 401a.

In an exemplary embodiment, the web interface 411 includes the following: (1) a network configuration web interface; (2) a User/Admin web interface which includes but not limited to user profile configuration, log reporting interface, and administrative user interface; (According to one embodiment, the web interface provides functions for configuring the appliance 401 to be deployed and integrated into the network infrastructure of the installer. In one embodiment, all other interfaces can communicate through the MRSm 401a or to a storage module 401e directly.

For ensuring proper dispatching of system messages received at the MRSm 401a, a message manager 401b can be used in this exemplary embodiment. These messages can include such data as chat data, session system data logging, system message posting, and system message queries, etc.

The message processor module 401c receives system messages from MRSm 401a via the message manager module 401b. These messages can include such data as approval requests, notification requests, approval responses, session system data logging, system message posting, system message queries, permissions queries, and storage data retrievals.

The viewer module 401d is configured to reduce the amount of screen update data transmitted from the client-side. In an exemplary embodiment, the viewer module 401d includes the following components (not shown): a viewer component, and one or more remote screen image servers. These servers collect RSI change updates and send them on to the RSI viewer via the MRSm 401a. The viewer component receives RSI update data from a client-side (remote-side in this case) server via the MRSm 401a and then sends the data off to the active servers to be transmitted to the appropriate destination. The main stream of RSI update data can be transmitted to the appropriate client via the MRSm

401*a*. Another stream of screen update data is transmitted to the recorder module 401*g* to be written into the storage module 401*e*.

The SSL module 401*f* ensures that the data transfer between the appliance 401 and the accessor and endpoint system (403 and 405) is encrypted, e.g., 256-bit AES SSL encryption over links 417 and 419.

In one embodiment, the remote access and control appliance 401 utilizes an operating system (OS) 401*h* that supports a variety of applications. For example, a web server application can run on top of the OS 401*h* to provide web hosting capabilities. The OS 401*h* can also support SSL. The SSL wrapper module 401*f* provides SSL over Transmission Control Protocol (TCP) or other network protocols.

As described, in one embodiment, the network appliance utilizes an OS 401*h* with a web server for providing web hosting capabilities. The routing and handling module (e.g., MRSm) 401*a*, which is a transport layer atop the OS 401*h*, provides various network facilities. Accordingly, MRSm 401*a* provides the generic means of transporting data from one system to another.

The MRSm 401*a* of the network appliance 401 can communicate with the endpoint application of endpoint system 405, and the accessor application of the accessor system 403 or another appliance.

Under this example, the accessor system 403 and endpoint system 405 include operating systems 403*a*, 405*a*; backend components 403*b*, 405*b*; and GUIs 403*c*, 405*c*. The backend components 403*b* of the accessor system 403 can include a MRSm 403*d*, a message manager module 403*e*, and a file transfer manager module 403*f*. The module 403*f* interfaces with a storage module 403*g*, which is configured to store retrieved content stemming from the operation of the file transfer manager module 403*f*. The backend components 403*b* also include a RSI manager module 403*h*. Yet another module 403*i* (i.e., OS interface module), which is integral to the backend components 403*b*, provides communication interfaces to the OS 403*a*. As shown, the backend components 405*b* of the endpoint system 405 resemble that of the backend components 403*b* of the accessor system 403: a MRSm 405*d*, a message manager module 405*e*, and a file transfer manager module 405*f*, a storage module 405*g*, a RSI manager module 405*h*, an OS interface module 405*i*.

As for the GUI 403*c*, the accessor system 403 can provide a number of interfaces depending on the applications. For instance, the GUI 403*c* can include a chat interface 403*j*, a file transfer interface 403*k*, a queue interface 403*l*, and a viewer 403*m*. In this example, the endpoint system 405 utilizes a chat interface 405*j* and a viewer 405*k*. The GUI 403*c* can include other interfaces such as remote command shell, system diagnostics, and system information to name a few. The GUI 405*c* can include application specific chooser interface to only allow specific application viewing.

As explained with respect to the operation of the network appliance 401, the MRSm 403*d* is the medium for handling all messages coming to the accessor application 421 and all messages sent from the accessor application 421. The MRSm 403*d* communicates with the message manager 403*e*, a RSI manager 403*h*, and the file-transfer manager modules 403*f*. The system messages, session data, and chat data are delivered to the message manager module 403*e*. The MRSm 403*d* sends, as well as receives, system/control messages and RSI update data to and from the RSI manager module 403*h*. The MRSm 403*d* interacts with the file-transfer manager 403*f* in sending and receiving system messages and file-transfer data.

The file-transfer manager 403*f* handles all remote-to-local and local-to-remote (i.e. between the accessor system and the endpoint system) reading and writing of files. The system messages and file-transfer data are received and sent through the MRSm 403*d*. Notably, the file-transfer interface module 403*k* on the GUI component 403*c* receives data from the MRSm 403*d* and sends all data directly to the MRSm 403*d*. Assuming the permissions to the endpoint file system access have been granted, the processes and steps involved in transferring a file from accessor storage 403*g* to the endpoint storage 405*g* include an initiation of a file transfer from the file-transfer GUI, a system command message sent to the MRSm 403*d*. MRSm 403*d* delivers the command to the file-transfer manager module 403*f* to execute on constructing the data to be sent to MRSm 405*d* of the endpoint system 405 via the MRSm 403*d*. A system notification message is delivered to the message manager 403*e* via MRSm 403*d* to be displayed in the chat GUI 403*j* after being delivered there by the message manager 403*e*. The processes and steps involved in transferring a file from the endpoint to the accessor include an initiation from the file-transfer GUI 405*k*, a system command message sent to the file-transfer manager 405*f* via the endpoint MRSm 405*d*. The file-transfer manager 405*f* constructs a proper remote file transfer request, which is then sent through the endpoint MRSm 405*d* to the accessor MRSm 403*d* through the MRSm 401*a* on the appliance. The accessor MRSm 403*d* receives the request command, delivering it to the remote file-transfer manager 403*f*, which in turn, receives the file system data requested to be transmitted back to the endpoint MRSm 405*d* by the accessor MRSm 403*d* through the MRSm 401*a* on the appliance. The accessor MRS 403*d* delivers the file system data received from the endpoint MRS 405*d* to the file-transfer manager 403*f* for processing and storing in the local file system storage 403*g*. Also, a system notification message as well as a file-transfer GUI refresh command is delivered to the file-transfer GUI 403*k* via the dispatcher 403*e* from the MRS 403*d*.

The RSI manager modules 403*h* and 405*h*, in one embodiment, includes the following components: a RSI updater, which "paints" the RSI viewer GUIs 403*m* and 405*k* with RSI screen update data; RSI server, which utilizes the OS Communication Interface modules 403*i* and 405*i*. The OS communication interface modules 403*i* and 405*i* interfaces with the OS system 403*a* and 405*a* for detecting and listening for screen and system updates, collecting these updates, and packaging and encoding these updates into data to be then sent to the viewing system via the respective MRSm's.

The RSI manager modules 403*h* and 405*h* can also provide the capability of reverse viewing. In this mode, the viewing of the remote system is reversed to being viewed by the remote system.

The network appliance 401 also permit support representatives to predict and lower the total cost of ownership (TCO) vis-à-vis the ASP model, in which the support representatives are typically charged a monthly fee. With the network appliance 401, representatives can predict their budget without monthly fees, surcharges or overages.

Figure 5:
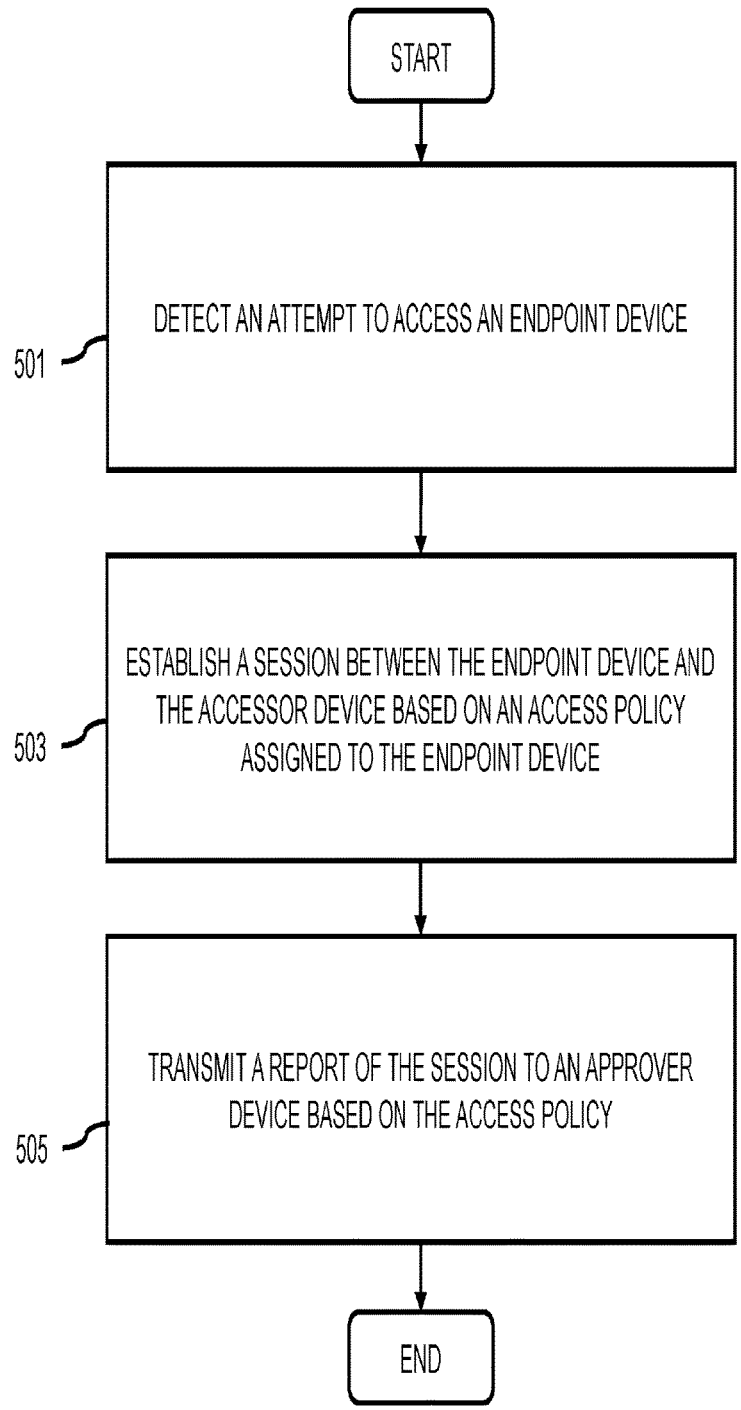
FIG. 5 is a flowchart of a process for providing and enforcing real time access controls, according to one example embodiment.

FIG. 5 is a flowchart of a process for providing and enforcing real time access controls, according to one example embodiment.

In step 501, the PAM appliance 101 detects an attempt to access an endpoint device 103 by an accessor device 105. In some embodiments, the endpoint device 103 is one of a plurality of endpoint devices within a network, and the PAM appliance 101 manages access rights to the plurality of endpoint devices within the network. In one embodiment, the PAM appliance 101 also manages network traffic among the plurality of endpoint devices, the accessor device 105, the approver device 107, and other systems of the network (e.g., administrator device 113).

In step 503, the PAM appliance 101 establishes a session between the endpoint device 103 and the accessor device 105 based on an access policy assigned to the endpoint device 103. In one embodiment, the access policy specifies access control restrictions, that are enforced by the PAM appliance 101, using permissions, settings, and/or assignments. These access policies may include temporal, location, and/or resource restrictions as well as restrictions on access instances.

In step 505, the PAM appliance 101 transmits a report of the session to an approver device 107 based on the access policy. The report may include access information, audit information, and/or session information associated with the access to the endpoint device 103, as well as other session related information (e.g., information associated to the session between the endpoint 103 and accessor 105). Finally, the approver device 107 may automatically grant approval based on an approval policy related to the endpoint device 103, accessor device 105, and/or the network. The approval policy may include temporal, location, devices, and/or resource restrictions as well as restrictions on access instances. In one embodiment, the approval policy may also be used to determine whether a response to a request for access complies with the approval policy and override the response of an administrator using the approver device, based on the approval policy.

Figure 6:
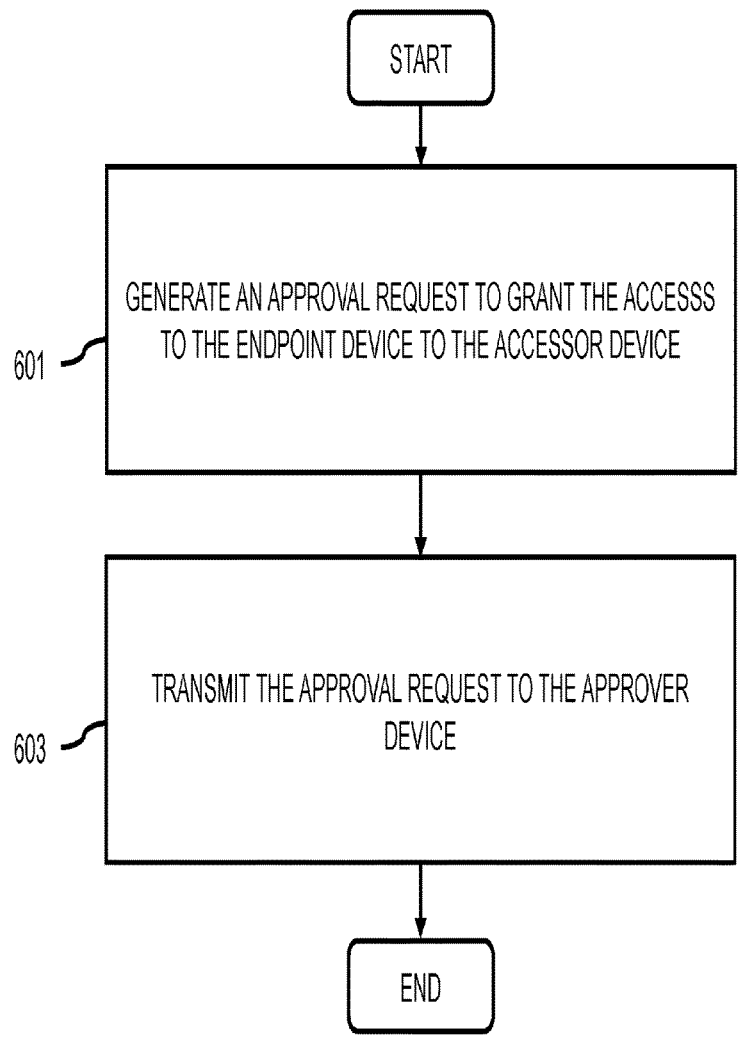
FIG. 6 is a flowchart of a process for generating and transmitting approval requests for providing access to accessor devices, according to one example embodiment.

FIG. 6 is a flowchart of a process for generating and transmitting approval requests for providing access to accessor devices, according to one example embodiment.

In step 601, the PAM appliance 101 generates an approval request for the accessor device 105, in order to provide access to the endpoint device 103 by the accessor device 105.

In step 603, the PAM appliance 101 then transmits the approval request to the approver device 107. The approver device 107 may then approve, deny, apply further conditions to access, comment on the request/access (e.g., notify the accessor device 105 of deficiencies, issues, etc.), apply different policies for the session, and/or join the approver device 105 to the session, for providing access by the accessor device 105 to the endpoint device 103.

Figure 7A:
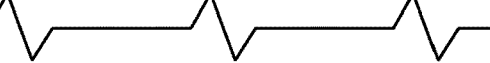
Figure 7C:
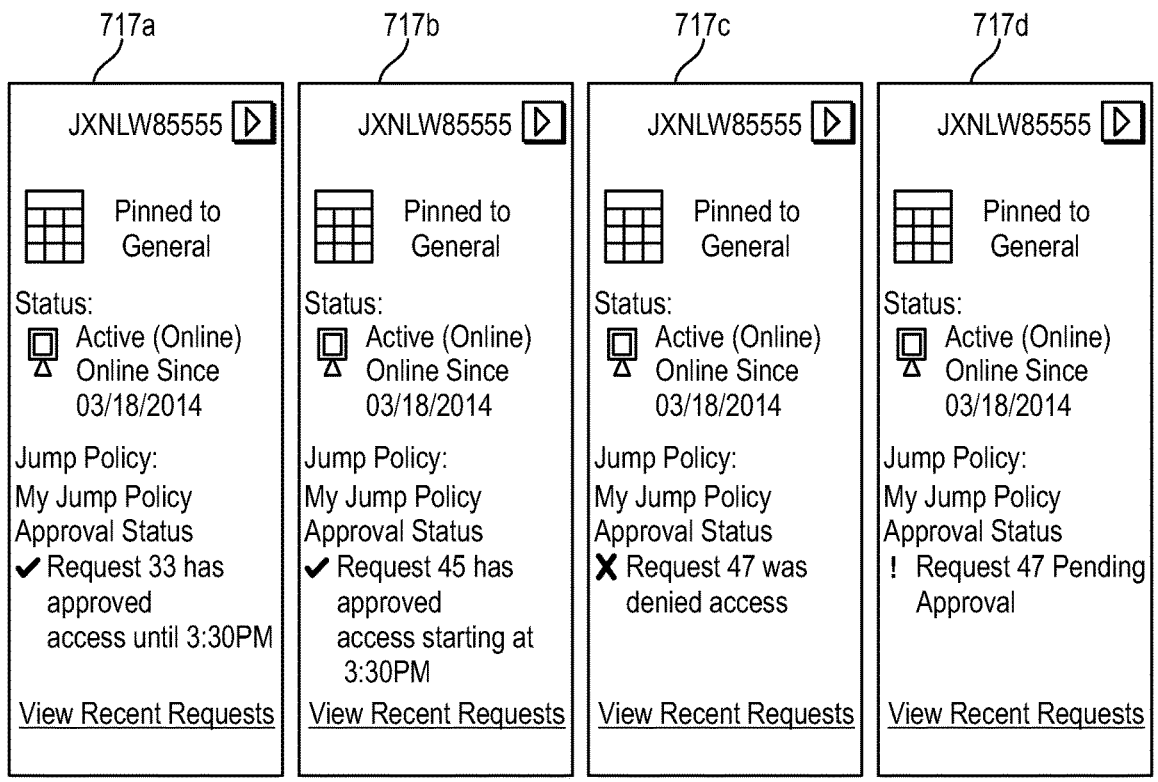
Figure 7C:
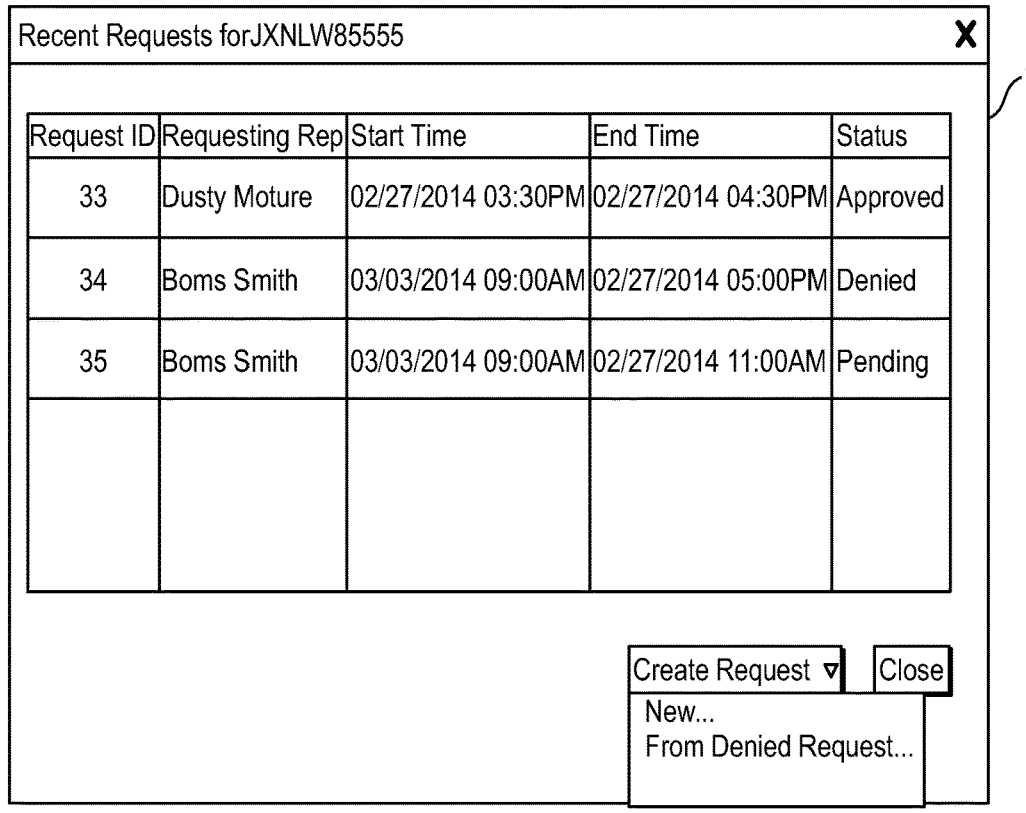

FIGS. 7A-7C are diagrams of example user interfaces used in the processes of FIGS. 1-6, according to various embodiments. FIG. 7A is an example user interface for creating access policies according to the approaches of the various embodiments described herein. In the example of FIG. 7A, the policy creation user interface includes fields for specifying a display name 701, code name 703, and description 705. The user interface also includes fields for specifying related access schedules 707, session notifications 709, and session approvals 711.

FIG. 7B depicts an example user interface for requesting access approval according to the various embodiments described herein. In the example of FIG. 7B, the access approval user interface identifies the applicable policy 701, related policy description 705, and designated approvers 711. The user interface also includes fields to specify a reason for the access approval request 713 and requested access times 715.

FIG. 7C depicts an example user interface for presenting and monitoring access requests initiated according to the various embodiments described herein. By way of example, the user interface of FIG. 7C presents information regarding active sessions including information on access policies applicable to the sessions and access approval status information. As shown, the active sessions 717a-d related to a particular resource or resources (e.g., resource JXNLWS5555). In one embodiment, a user can select one or more of the active sessions 717a-d to pin to an active desktop, window, or other user interface element to facilitate monitoring. In addition, recent or other historical access information related to the resource/resources can be presented (e.g., previous requests, pending requests, and/or future requests) 719. In one embodiment, the user interface can also provide for create new requests from new information or from previous requests (e.g., previously denied requests).

Figure 8:
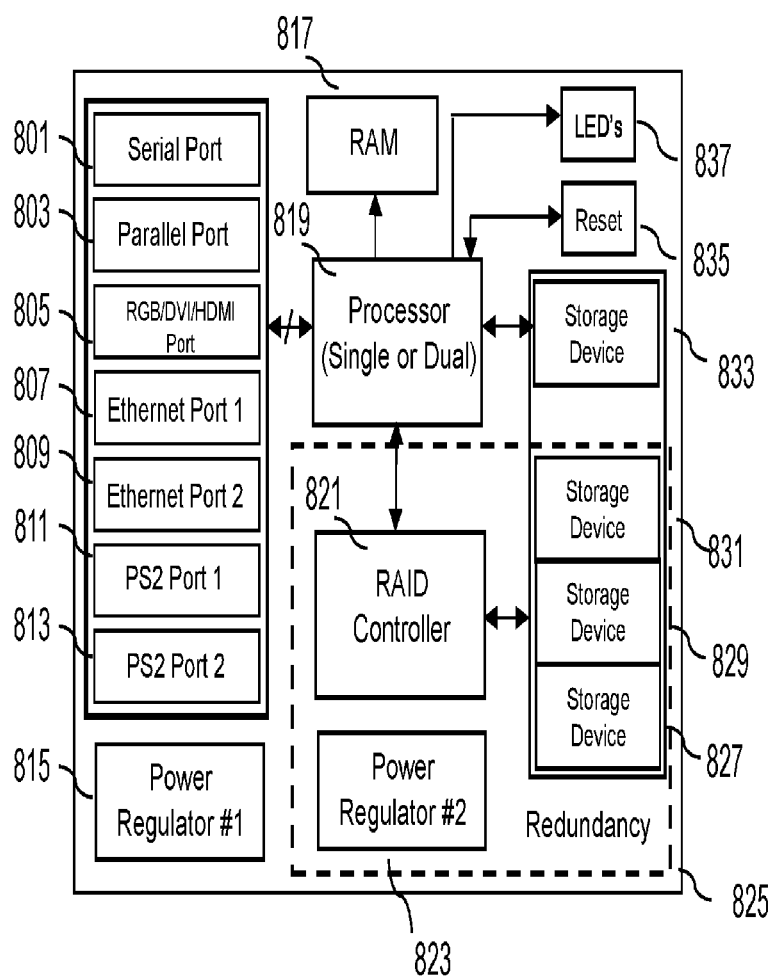
FIG. 8 is an exemplary hardware architecture of a remote access and control appliance, according to an exemplary embodiment.

FIG. 8 is an exemplary hardware architecture of a remote access and control appliance, according to an exemplary embodiment. The network appliance 101, in one embodiment, comprises various component interfaces, including serial and parallel ports 801 and 803, a display interface (e.g., an RGB (Red, Green and Blue) port 805), local area network (LAN) ports (e.g., Ethernet ports) 807 and 809, and input device ports (e.g., PS2) 811 and 813. The network appliance 101 also contains a power regulator 815, internal memory in the form of RAM (Random Access Memory) 817, one or more processors 819, each which may be a multi-core processor, LEDs (Light Emitting Diodes) 837, reset control 835 and a SATA (Serial Advanced Technology Attachment) storage drive 833.

As mentioned, the network appliance 101, in an exemplary embodiment, can be a 1 U rack-mountable server hardware. However, it is contemplated that configurations other than those illustrated in FIG. 8 can be constructed, depending on the particular applications. For example, different types of appliances can be designed for different uptime requirements. With uptime-critical customers, the network appliance 101 provides for fail-over redundancies; e.g., use of multiple disk drives 827-831, for Fail-over and Hot-Swap capabilities via a RAID (Redundant Array of Independent Disks) controller 821. This configuration of the appliance 101 can also be equipped with a backup AC-DC (Alternating Current-Direct Current) regulator 823, which can be triggered when the main regulator 815 is detected as non-functional. Alternatively, for non-uptime-critical customers, the network appliance 101 can be configured without the additional hardware and/or software required for providing redundancies.

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
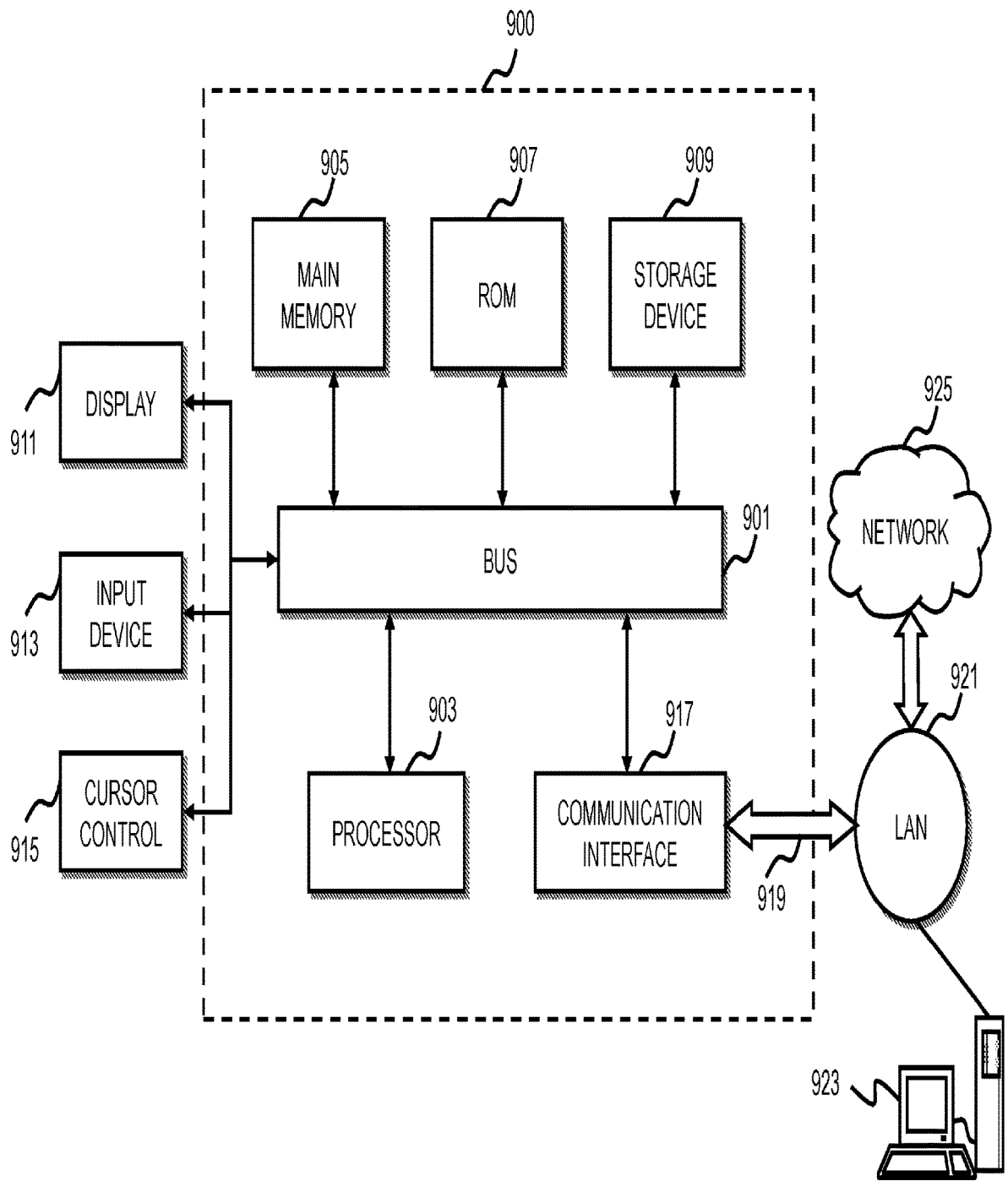
FIG. 9 is a diagram of a computer system that can be used to implement various embodiments of the invention.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main meGEmory can optionally be stored on storage device either before or after execution by processor.

Figure 10:
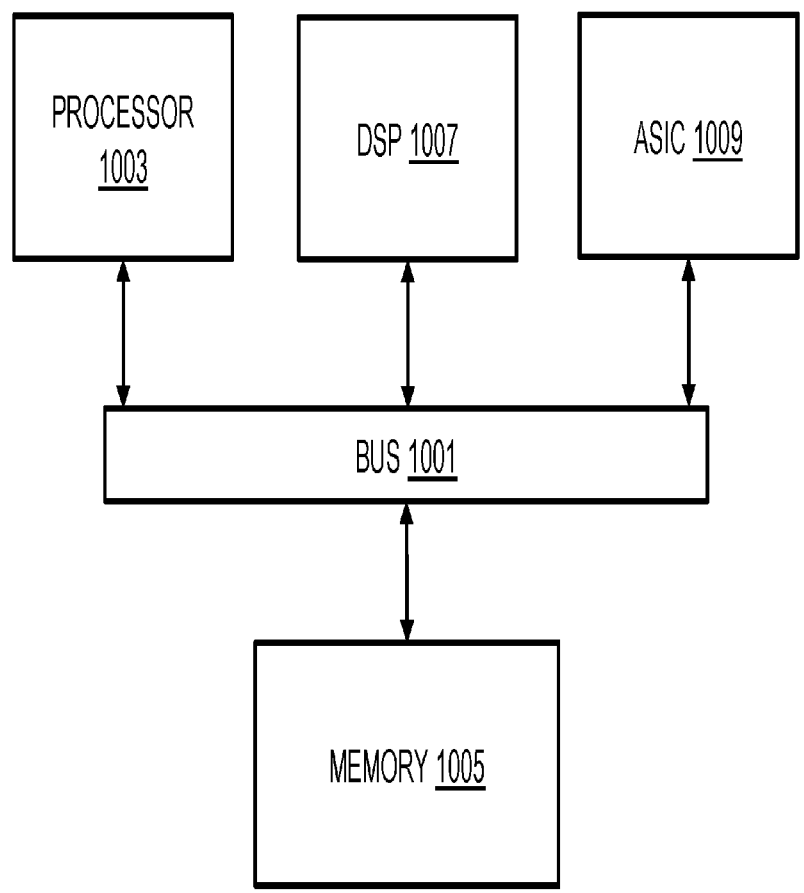
FIG. 10 is a diagram of a chip set that can be used to implement various exemplary embodiments.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 1B, 5, and 6.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1005 also stores the data associated with or generated by the execution of the inventive steps.

While the invention has been described in connection with a number of embodiments and implementations, the invention is not so limited but covers various obvious modifications and equivalent arrangements, which fall within the purview of the appended claims.

What is claimed is:

1. A privileged access management (PAM) apparatus comprising at least one computing device comprising a hardware processor, the at least one computing device configured to:
   push an access application to an endpoint device in response to receiving a first request from an accessor device, wherein the access application is automatically executed by the endpoint device, wherein the endpoint device and the accessor device are separate devices;
   receive a second request to connect from the access application;
   establish an access session between the accessor device and the access application executed by the endpoint device to provide access to at least one resource of the endpoint device based on a conversion of a first access protocol used by the PAM apparatus to a second access protocol used by the endpoint device; and
   provide a credential for the accessor device for use in the access session based on an in-session policy.

2. The PAM apparatus of claim 1, wherein the at least one computing device is further configured to push the access application to the endpoint device based on at least one of: a system management bus, a remote procedure call, inter process communications, a file transfer protocol, a secure shell, or a hypertext transfer protocol.

3. The PAM apparatus of claim 1, wherein the at least one computing device is further configured to:
   receive a third request from a second accessor device to access a second endpoint device;
   push another access application to the second endpoint device;
   receive a fourth request to connect from the other access application; and
   establish a second session between the second accessor device and the second endpoint device.

4. The PAM apparatus of claim 1, wherein the endpoint device excludes a pre-installed access client.

5. The PAM apparatus of claim 1, wherein the at least one computing device is further configured to execute a push service to handle operations for pushing the access application to the endpoint device.

6. The PAM apparatus of claim 1, wherein the at least one computing device is further configured to manage access rights to the endpoint device.

7. The PAM apparatus of claim 1, wherein establishing the access session comprises providing the accessor device with real time access control to resources of the endpoint device.

8. A method comprising:
   in response to receiving a first request from an accessor device, sending an access application to an endpoint device, wherein the access application is automatically executed by the endpoint device, wherein the endpoint device and the accessor device are separate devices;
   receiving a second request for connection from the access application;
   establishing, via the access application, an access session between the accessor device and the endpoint device to provide access to at least one resource of the endpoint device;
   converting, via a protocol agent and for the access session, a first access protocol used by a privileged access management (PAM) appliance to a second access protocol used by the endpoint device; and
   granting access to a credential for the accessor device for use in the access session based on an in-session policy.

9. The method of claim 8, wherein sending the access application to the endpoint device is performed by the protocol agent on behalf of the privileged access management (PAM) appliance.

10. The method of claim 9, wherein the protocol agent communicates with the endpoint device on a local network and communicates with the PAM appliance on a wide-area network.

11. The method of claim 8, wherein a PAM appliance establishes the access session and the method further comprises managing, via the PAM appliance, access rights to a plurality of endpoint devices including the endpoint device and respective access session traffic.

12. The method of claim 8, further comprising determining the in-session policy for the access session, wherein the in-session policy grants or denies access to at least one of: a tool, a command, or a resource for the endpoint device.

13. The method of claim 8, wherein sending the access application to the endpoint device is performed by the accessor device.

14. The method of claim 8, further comprising assigning the in-session policy to the accessor device.

15. A system comprising:
a data store comprising an access application;
an endpoint device; and
a privileged access management (PAM) appliance in communication with the endpoint device and the data store, the PAM appliance comprising a hardware processor and being configured to:
in response to receiving a first request from an accessor device, retrieve the access application from the data store, wherein the endpoint device and the accessor device are separate devices;
push the access application to the endpoint device;
receive a second request for connection from the access application;
establish an access session between the accessor device and the access application executed by the endpoint device to provide access to at least one resource of the endpoint device based on a conversion of a first access protocol used by the PAM appliance to a second access protocol used by the endpoint device; and
grant, to the accessor device, access to a credential based on an in-session policy.

16. The system of claim 15, wherein the endpoint device is configured to:
receive the access application from the PAM appliance; and
in response to receiving the access application, automatically execute the access application.

17. The system of claim 15, further comprising a protocol agent in communication via a local area network with the endpoint device, wherein the access application is pushed to the endpoint device via the protocol agent.

18. The system of claim 15, further comprising a protocol agent configured to:
connect to the endpoint device using the first access protocol via a first network;
connect to the PAM appliance using the second access protocol via a second network; and
perform the conversion of the first access protocol used by the PAM appliance to the second access protocol used by the endpoint device.

19. The system of claim 15, wherein the PAM appliance is further configured to establish a persistent connection to a protocol agent based on a certificate based authentication.

20. The system of claim 15, wherein the PAM appliance is further configured to further grant, to the accessor device, access to at least one of: a command or a tool on the endpoint device based on the in-session policy.

* * * * *